United States Patent
Takemoto et al.

(10) Patent No.: US 11,927,569 B2
(45) Date of Patent: Mar. 12, 2024

(54) ULTRASONIC FLAW DETECTION DEVICE, ULTRASONIC FLAW DETECTION METHOD, AND ULTRASONIC FLAW DETECTION PROGRAM

(71) Applicant: MITSUBISHI HEAVY INDUSTRIES, LTD., Tokyo (JP)

(72) Inventors: Hiroshi Takemoto, Tokyo (JP); Mitsuyoshi Uematsu, Tokyo (JP); Seiji Kobayashi, Tokyo (JP); Takahito Shimomukai, Tokyo (JP); Naoya Iwata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 422 days.

(21) Appl. No.: 17/419,943

(22) PCT Filed: Jan. 30, 2020

(86) PCT No.: PCT/JP2020/003323
§ 371 (c)(1),
(2) Date: Jun. 30, 2021

(87) PCT Pub. No.: WO2020/189042
PCT Pub. Date: Sep. 24, 2020

(65) Prior Publication Data
US 2022/0065821 A1    Mar. 3, 2022

(30) Foreign Application Priority Data

Mar. 20, 2019  (JP) .................... 2019-052985

(51) Int. Cl.
*G01N 29/26*   (2006.01)
*G01N 29/04*   (2006.01)
*G01N 29/44*   (2006.01)

(52) U.S. Cl.
CPC ........... *G01N 29/262* (2013.01); *G01N 29/04* (2013.01); *G01N 29/4463* (2013.01); *G01N 2291/023* (2013.01); *G01N 2291/0289* (2013.01)

(58) Field of Classification Search
CPC ............. G01N 29/00; G01N 29/04–12; G01N 29/22–26; G01N 29/262; G01N 29/44;
(Continued)

(56) References Cited

U.S. PATENT DOCUMENTS 9,201,047 B1    12/2015  Walton
9,347,918 B2 *   5/2016  Bond-Thorley ..... G01N 29/262
(Continued)

FOREIGN PATENT DOCUMENTS

CN    106501377 A  *  3/2017  ........... G01N 29/262
CN    108020598 A  *  5/2018  ........... G01N 29/262
(Continued)

OTHER PUBLICATIONS

PCT/ISA/210, "International Search Report for International Application No. PCT/JP2020/003323," dated Apr. 7, 2020.

*Primary Examiner* — Nguyen Q. Ha
(74) *Attorney, Agent, or Firm* — Manabu Kanesaka; Benjamin Hauptman; Kenneth Berner

(57) ABSTRACT

Ultrasonic flaw detection uses a phased-array ultrasonic-flaw-detection probe. The flaw detection probe is placed such that the center of curvature of the flaw detection probe coincides with a reference center of curvature of a subject. The flaw detection probe is translated along a scan direction. The flaw detection probe emits an ultrasonic beam such that the position upon which the ultrasonic beam converges coincides with the center of curvature of the curve of the outline of the cross section of the subject at the scan position, receives the resulting reflected beam, and estimates the
(Continued)

length of a flaw in the circumferential direction of the subject. In addition, the estimated length of the flaw is corrected using a correction coefficient corresponding to the distance between the center of curvature of the reference scan position and the center of curvature of the scan position in the thickness direction of the subject.

6 Claims, 10 Drawing Sheets

(58) Field of Classification Search
CPC ......... G01N 29/4463; G01N 2291/023; G01N 2291/0289
See application file for complete search history.

(56) References Cited

U.S. PATENT DOCUMENTS

| | | |
|---|---|---|
| 2011/0030479 A1 | 2/2011 | Murai et al. |
| 2016/0156885 A1 | 6/2016 | Horikawa et al. |
| 2017/0067855 A1 | 3/2017 | Köber et al. |

FOREIGN PATENT DOCUMENTS

| | | |
|---|---|---|
| JP | H02-246959 A | 10/1990 |
| JP | 2007-170877 A | 7/2007 |
| JP | 2012-002781 A | 1/2012 |
| JP | 2012-090780 A | 5/2012 |
| JP | 2015-031881 A | 2/2015 |
| JP | 2018-077097 A | 5/2018 |
| WO | 2009/122904 A1 | 10/2009 |

* cited by examiner

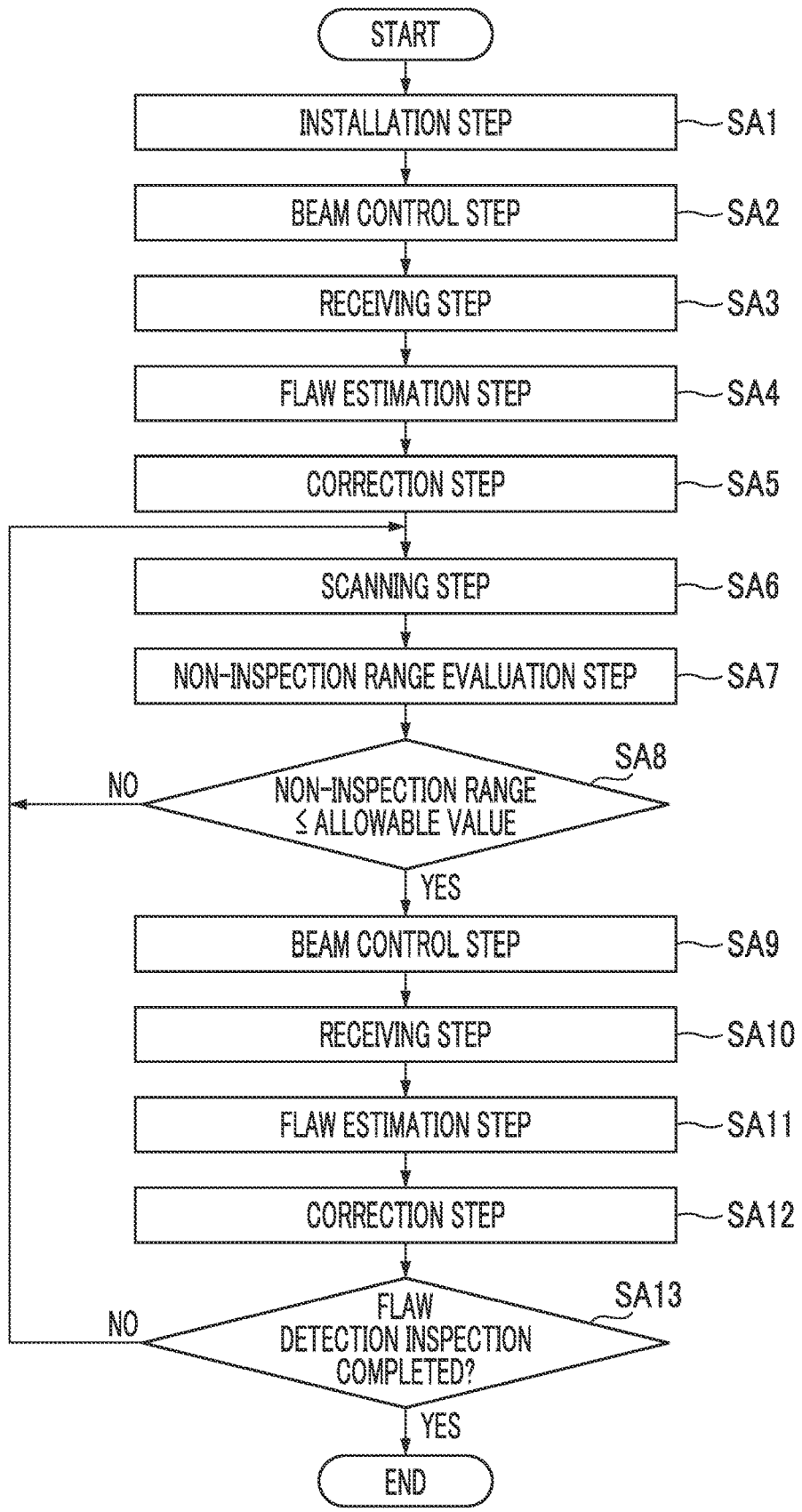

FIG. 10

| INSERT ID | ARTIFICIAL FLAW ACTUAL AREA (sq mm) | CORRECTION COEFFICIENT $Cf_{min}$ | CORRECTION COEFFICIENT $Cf_{max}$ | FLAW SIZE MEASURED BY C-scan (sq mm) | FLAW SIZE AFTER MEASUREMENT $Cf_{MIN}$ (sq mm) | FLAW SIZE AFTER MEASUREMENT $Cf_{MAX}$ (sq mm) |
|---|---|---|---|---|---|---|
| A2 | 161.29 | 0.326 | 0.318 | 508.3 | 165.563 | 161.744 |
| B2 | 161.29 | 0.246 | 0.24 | 496.6 | 122.079 | 119.263 |
| C2 | 122.58 | 0.161 | 0.157 | 426.8 | 68.531 | 66.95 |

ULTRASONIC FLAW DETECTION DEVICE, ULTRASONIC FLAW DETECTION METHOD, AND ULTRASONIC FLAW DETECTION PROGRAM

RELATED APPLICATIONS

The present application is National Phase of International Application No. PCT/JP2020/003323 filed Jan. 30, 2020, and claims priority from Japanese Application No. 2019-052985, filed Mar. 20, 2019, the disclosure of which is hereby incorporated by reference herein in its entirety.

TECHNICAL FIELD

The present invention relates to an ultrasonic flaw detection device, an ultrasonic flaw detection method, and an ultrasonic flaw detection program.

BACKGROUND ART

In recent years, phased-array type ultrasonic flaw detection devices and ultrasonic flaw detection methods have been attracting attention as one technique of ultrasonic flaw detection for inspecting flaws in solids or liquids inside pipes, pressure vessels, or materials. The features of the ultrasonic flaw detection technique using a phased-array ultrasonic flaw detection probe are that an ultrasonic beam can be delivered in a given direction, the ultrasonic beam can be converged at a given position, beam scanning can be switched electronically at high speed, and the like. Here, the phased-array ultrasonic flaw detection probe generally includes a configuration in which a plurality of oscillators are disposed in a row or in a plane. However, a flaw detection surface of the subject is rarely a flat surface. In many cases, the flaw detection surface is a curved surface or has a complicated shape like a welded part of a pipe.

Thus, there is suggested a flexible phased-array ultrasonic flaw detection probe in which a row or plane in which the oscillators are disposed is capable of having a given curvature such that lower ends of the oscillators abut against the flaw detection surface even when the flaw detection surface is a curved surface. For example, PTL 1 describes a flexible ultrasonic probe used in a medical ultrasonic diagnostic apparatus, which is formed by connecting a plurality of array-shaped microoscillator assemblies in a plate shape to each other.

An ultrasonic flaw detection technique has also been suggested in which information on the surface shape of a subject is acquired in advance and flaw detection is performed with reference to the surface shape information in order to accurately detect flaws in a complicated part such as a welded part of a pipe. For example, PTL 2 describes a technique of acquiring information on the surface shape of a subject in advance, using a phased-array ultrasonic flaw detection probe, and controlling the delay time of ultrasonic waves emitted from each oscillator of a flaw detection probe such that a predetermined position inside the subject is set as an ultrasonic converging position, on the basis of the acquired surface shape information.

CITATION LIST

Patent Literature

[PTL 1] Japanese Unexamined Patent Application Publication No. H2-246959

[PTL 2] Japanese Unexamined Patent Application Publication No. 2007-170877

SUMMARY OF INVENTION

Technical Problem

However, in the related-art ultrasonic flaw detection technique using the above-described flexible phased-array ultrasonic flaw detection probe, in a case where the external shape of the subject is a curved surface and the curvature of the external shape changes with the movement scanning of the flaw detection probe, the spacing between the oscillator disposition surface of the flaw detection probe and the external surface of the subject also changes with the change in the curvature of the external shape. In this case, even when the converging position of the ultrasonic beam is changed to an appropriate position in conformity with the curvature of the external surface, there is a problem that a detection error occurs due to a difference in beam propagation distance and the detection accuracy decreases.

The present invention has been made in view of such circumstances, and an object thereof is to provide an ultrasonic flaw detection device, an ultrasonic flaw detection method, and an ultrasonic flaw detection program capable of improving the reliability of inspection in ultrasonic flaw detection using a phased-array ultrasonic flaw detection probe.

Solution to Problem

A first aspect of the present invention is an ultrasonic flaw detection device that performs an ultrasonic flaw detection on a subject of which an external shape changes in a scan direction, using a flaw detection probe that is a phased-array ultrasonic flaw detection probe in which a plurality of oscillators are disposed in an arc shape at intervals. The ultrasonic flaw detection device includes a scanning unit that moves, in the scan direction, the flaw detection probe installed such that a reference curvature center, which is a curvature center of an external curve of a cross section of the subject at a reference scan position of the subject, coincides with a curvature center of the flaw detection probe; a beam control unit that controls an ultrasonic beam emitted from the flaw detection probe such that a converging position of the ultrasonic beam coincides with an inspection curvature center that is a curvature center of an external curve of a cross section of the subject at each scan position; a receiving unit that receives a reflected beam reflected from the subject; and a flaw estimation unit that estimates a length of a flaw in a circumferential direction of the subject on the basis of the reflected beam; and a correction unit that corrects an estimated length of the flaw by using a correction coefficient according to an amount of deviation between the reference curvature center and each inspection curvature center in a thickness direction of the subject.

According to the above ultrasonic flaw detection device, in a case where the flaw detection inspection of the subject is performed at the inspection scan position that is the scan position different from the reference scan position, the ultrasonic beam is emitted from the flaw detection probe such that the inspection curvature center, which is the curvature center of the external curve of the cross section of the subject, coincides with and the converging position of the ultrasonic beam, and the length of the flaw in the circumferential direction of the subject is estimated using the reflected beam. In this case, at the inspection scan position, unlike the reference scan position, there is a case where ultrasonic waves cannot be made to be perpendicularly incident from each oscillator toward the external surface of the subject. In such a case, since the propagation distance or the like of the ultrasonic waves propagated from each oscillator is different, an error occurs in the length of the flaw estimated by the flaw estimation unit. Even in such a case, according to the ultrasonic flaw detection device, a correction coefficient according to the amount of deviation between the reference curvature center and the inspection curvature center in the thickness direction of the subject are used to correct the length of the flaw estimated by the flaw estimation unit. Thus, the inspection accuracy can be improved, and the reliability of the inspection can be improved.

The above ultrasonic flaw detection device may further include a non-inspection range evaluation unit that evaluates a non-inspection range where the reflected beam from the subject cannot be received in accordance with the amount of deviation between the reference curvature center and each inspection curvature center in the thickness direction of the subject.

As described above, at the inspection scan position, there is a case where ultrasonic waves cannot be made to be perpendicularly incident from each oscillator toward the external surface of the subject. Then, in such a case, a non-inspection range where the reflected beam from the subject cannot be received may occur. In such a case, the non-inspection range evaluation unit that evaluates the non-inspection range where the reflected beam cannot be received is provided. Thus, for example, in a case where the non-inspection range exceeds the allowable value, it is possible to take measures such as re-inspection using a flaw detection probe that is more suitable for the external shape of the subject at the inspection scan position without performing the flaw detection inspection at the inspection scan position. Accordingly, it is possible to suppress a decrease in inspection accuracy due to the non-inspection range being larger than the allowable value.

A second aspect of the present invention is an ultrasonic flaw detection method of performing an ultrasonic flaw detection on a subject of which an external shape changes in a scan direction, using a flaw detection probe that is a phased-array ultrasonic flaw detection probe in which a plurality of oscillators are disposed in an arc shape at intervals. The ultrasonic flaw detection method includes an installation step of installing, the flaw detection probe such that a reference curvature center, which is a curvature center of an external curve of a cross section of the subject at a reference scan position of the subject, coincides with a curvature center of the flaw detection probe; a scanning step of moving the flaw detection probe in the scan direction of the subject; a beam control step of controlling an ultrasonic beam emitted from the flaw detection probe such that a converging position of the ultrasonic beam coincides with an inspection curvature center that is a curvature center of an external curve of a cross section of the subject at each scan position; a receiving step of receiving a reflected beam reflected from the subject; and a flaw estimation step of estimating a length of a flaw in a circumferential direction of the subject on the basis of the reflected beam; and a correction step of correcting an estimated length of the flaw by using a correction coefficient according to an amount of deviation between the reference curvature center and each inspection curvature center in a thickness direction of the subject.

The above ultrasonic flaw detection method may further include a non-inspection range evaluation step of evaluating a non-inspection range where the reflected beam from the subject cannot be received in accordance with the amount of deviation between the reference curvature center and each inspection curvature center in the thickness direction of the subject.

A third aspect of the present invention is an ultrasonic flaw detection program making a computer execute an ultrasonic flaw detection on a subject of which an external shape changes in a scan direction, using a flaw detection probe that is a phased-array ultrasonic flaw detection probe in which a plurality of oscillators are disposed in an arc shape at intervals. The ultrasonic flaw detection method includes a scanning process of moving, in the scan direction of the subject, the flaw detection probe installed such that a reference curvature center, which is a curvature center of an external curve of a cross section of the subject at a reference scan position of the subject, coincides with a curvature center of the flaw detection probe; a beam control process of controlling an ultrasonic beam emitted from the flaw detection probe such that a converging position of the ultrasonic beam coincides with an inspection curvature center that is a curvature center of an external curve of a cross section of the subject at each scan position; a receiving process of receiving a reflected beam reflected from the subject; a flaw estimation process of estimating a length of a flaw in a circumferential direction of the subject on the basis of the reflected beam; and a correction process of correcting an estimated length of the flaw by using a correction coefficient according to an amount of deviation between the reference curvature center and each inspection curvature center in a thickness direction of the subject.

The above ultrasonic flaw detection program may further include a non-inspection range evaluation process of evaluating a non-inspection range where the reflected beam from the subject cannot be received in accordance with the amount of deviation between the reference curvature center and each inspection curvature center in the thickness direction of the subject.

Advantageous Effects of Invention

According to the present invention, in the ultrasonic flaw detection using the phased-array ultrasonic flaw detection probe, there is an effect that the reliability of the inspection can be improved.

BRIEF DESCRIPTION OF DRAWINGS

FIG. 8 is a flowchart illustrating an example of a procedure of an ultrasonic flaw detection method according to the embodiment of the present invention.

FIG. 10 is a view illustrating an example of inspection results in a case where a flaw detection inspection is performed using the ultrasonic flaw detection device according to the embodiment of the present invention.

DESCRIPTION OF EMBODIMENTS

Hereinafter, an ultrasonic flaw detection device, an ultrasonic flaw detection method, and an ultrasonic flaw detection program according to an embodiment of the present invention will be described with reference to the drawings.

Figure 1:
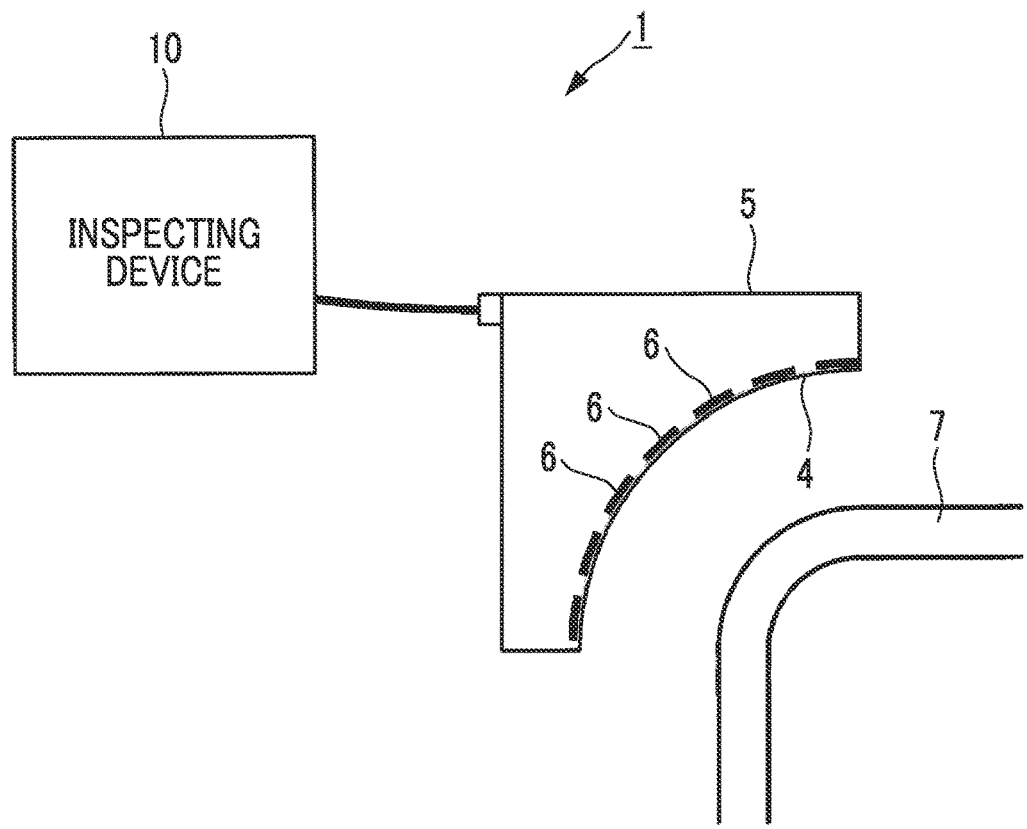
FIG. 1 is a schematic configuration diagram of an ultrasonic flaw detection device according to an embodiment of the present invention.

FIG. 1 is a configuration diagram of the ultrasonic flaw detection device according to the embodiment of the present invention. As illustrated in FIG. 1, the ultrasonic flaw detection device 1 includes a flaw detection probe 5 and an inspection device 10 as main components. The flaw detection probe 5 is a phased-array ultrasonic flaw detection probe and has a plurality of oscillators 6 disposed in a row at intervals along an arc of a curved surface 4. In the present embodiment, the flaw detection probe 5 will be described by way of exemplifying a case where a flaw detection inspection is performed using a curvature-fixed type flaw detection probe 5 in which the curvature of a curved surface on which the oscillators 6 are disposed does not change. However, the structure of the flaw detection probe 5 is not limited to this example and may be, for example, a flexible ultrasonic probe capable of deforming the curvature of the curved surface 4 on which the oscillators 6 are disposed.

Figure 2:
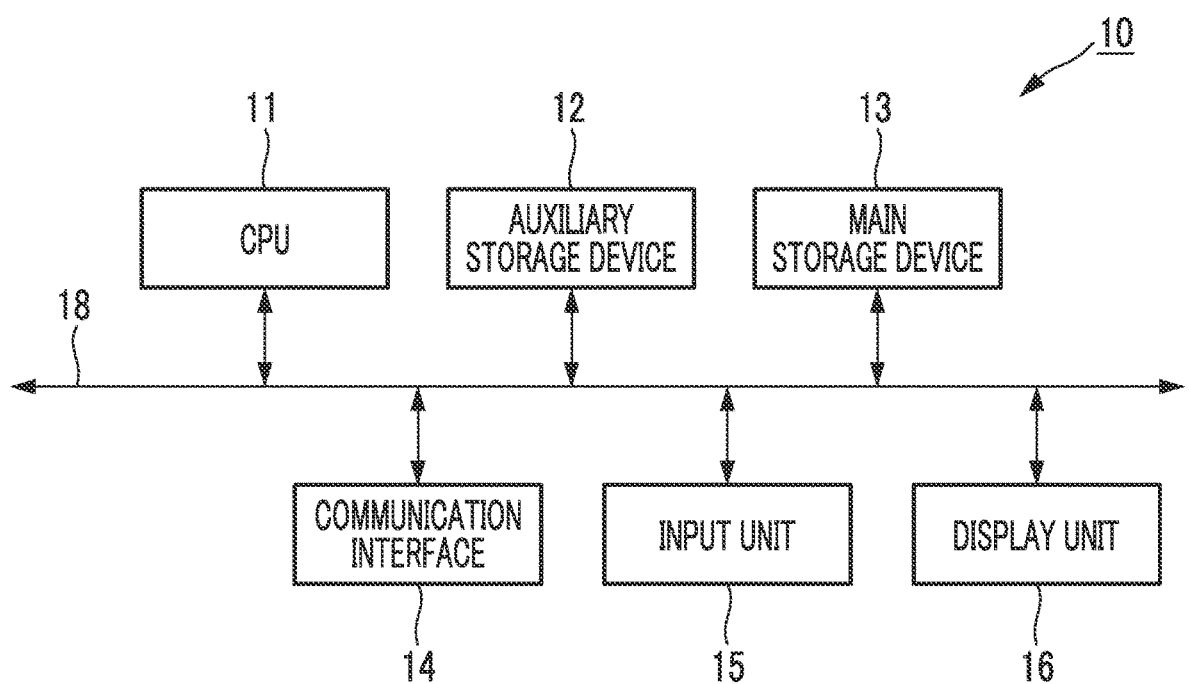
FIG. 2 is a schematic configuration diagram illustrating an example of a hardware configuration of an inspection device according to the embodiment of the present invention.

As illustrated in FIG. 2, the inspection device 10 includes, for example, a CPU 11, an auxiliary storage device 12 for storing a program executed by the CPU 11, a data referenced by the program, and the like, a main storage device 13 that functions as a work area at the time of executing each program, a communication interface 14 for connection to a network, an input unit 15 including a keyboard, a mouse, and the like, a display unit 16 including a liquid crystal display device and the like for displaying the data, and the like. Each of these units is connected via, for example, a bus 18. Examples of the auxiliary storage device 12 include a magnetic disk, a magneto-optical disk, a semiconductor memory, and the like.

A series of processing for realizing various functions to be described below is stored in an auxiliary storage device 12 in the form of a program (for example, the ultrasonic flaw detection program) as an example, and the CPU 11 reads the program into the main storage device 13 to execute information processing and arithmetic processing to realize the various functions. A form in which the program is installed in advance in the auxiliary storage device 12, a form in which the program is provided in a state of being stored in another computer-readable storage medium, a form in which the program is distributed via wired or wireless communication means, or the like may be applied. The computer-readable storage medium is a magnetic disk, a magneto-optical disk, a CD-ROM, a DVD-ROM, a semiconductor memory, or the like.

Figure 3:
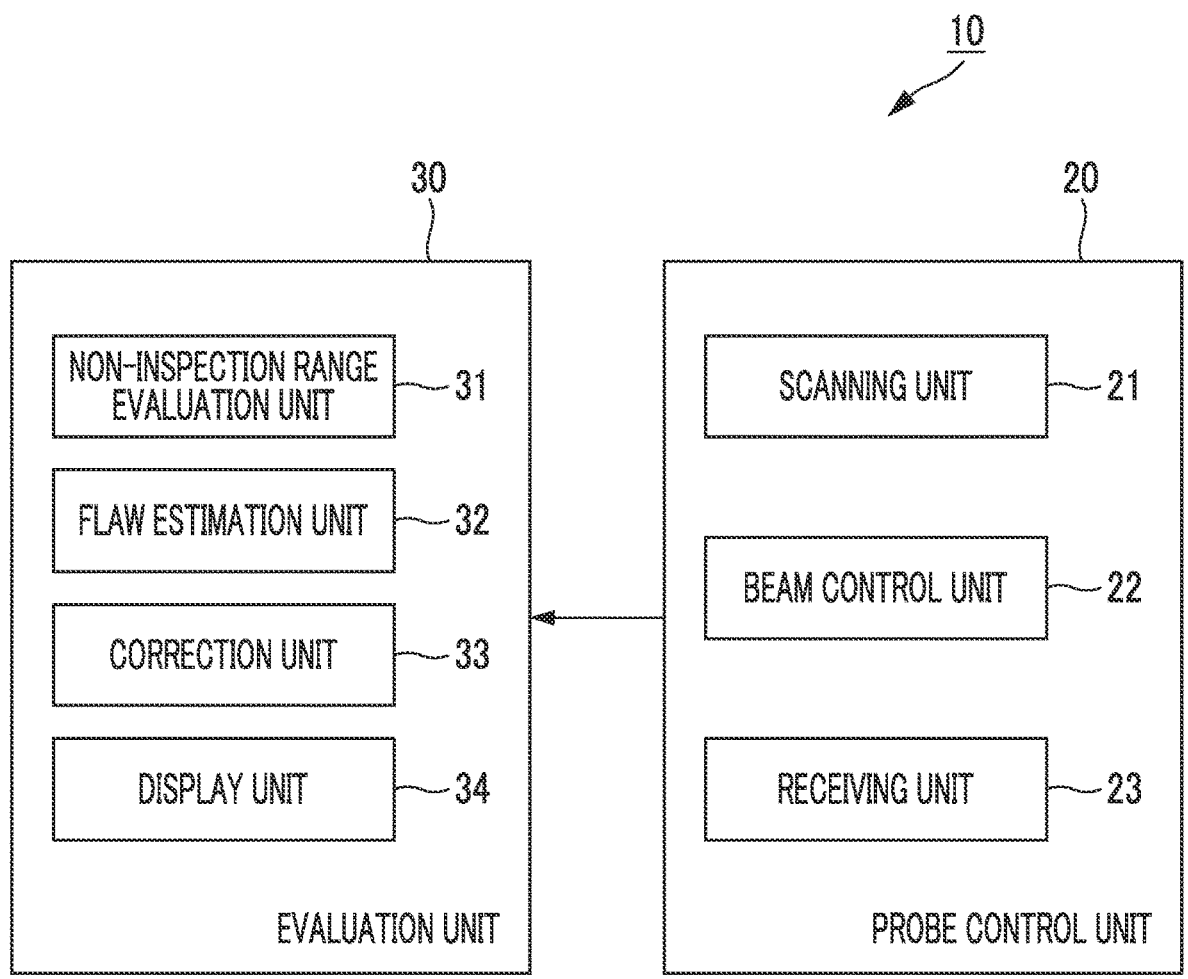
FIG. 3 is a functional block diagram illustrating an example of functions of the inspection device according to the embodiment of the present invention.

FIG. 3 is a functional block diagram illustrating an example of the functions of the inspection device 10 according to the present embodiment. As illustrated in FIG. 3, the inspection device 10 includes a probe control unit 20 for driving and controlling the flaw detection probe 5, and the evaluation unit 30 that performs a flaw detection inspection of a subject 7 on the basis of the information of a reflected beam acquired by the flaw detection probe 5.

The probe control unit 20 includes, for example, a scanning unit 21 that moves the flaw detection probe 5 in a scan direction of the subject 7 (refer to FIG. 4), a beam control unit 22 that controls the delay distribution of an ultrasonic beam emitted to the subject 7 in accordance with the shape of the subject 7 at each scan position and causes a desired ultrasonic beam to be emitted from the flaw detection probe 5, and a receiving unit 23 that receives a reflected beam from the subject 7 as main components.

The evaluation unit 30 includes a non-inspection range evaluation unit 31 that calculates the distance of a non-inspection range where flaws cannot be detected at each scan position of the subject 7, a flaw estimation unit 32 that estimates the length of a flaw in a circumferential direction of the subject 7 on the basis of a reflected beam reflected from the subject 7, a correction unit 33 that corrects the length of the flaw estimated by the flaw estimation unit 32, and a display unit 34 that displays an inspection result, as main components.

Figure 4:
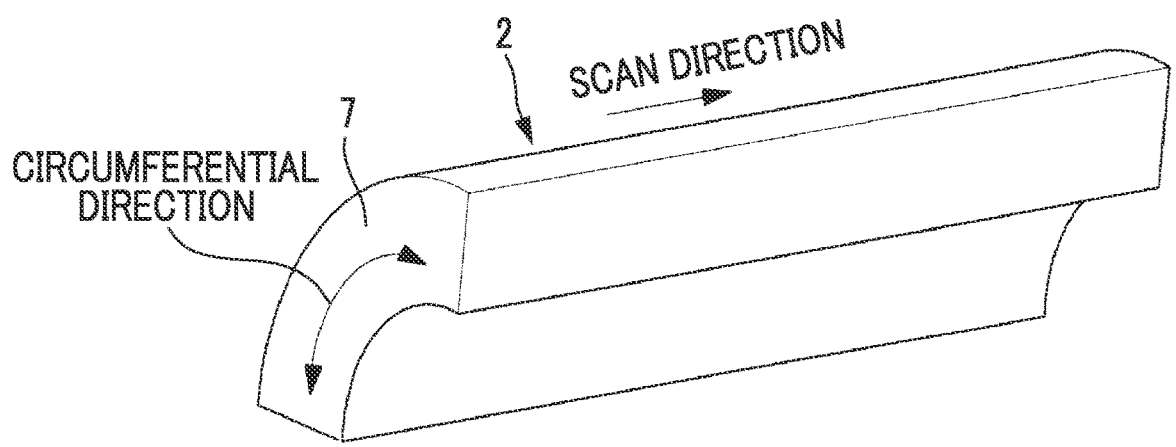
FIG. 4 is a view illustrating an example of a subject.
Figure 5:
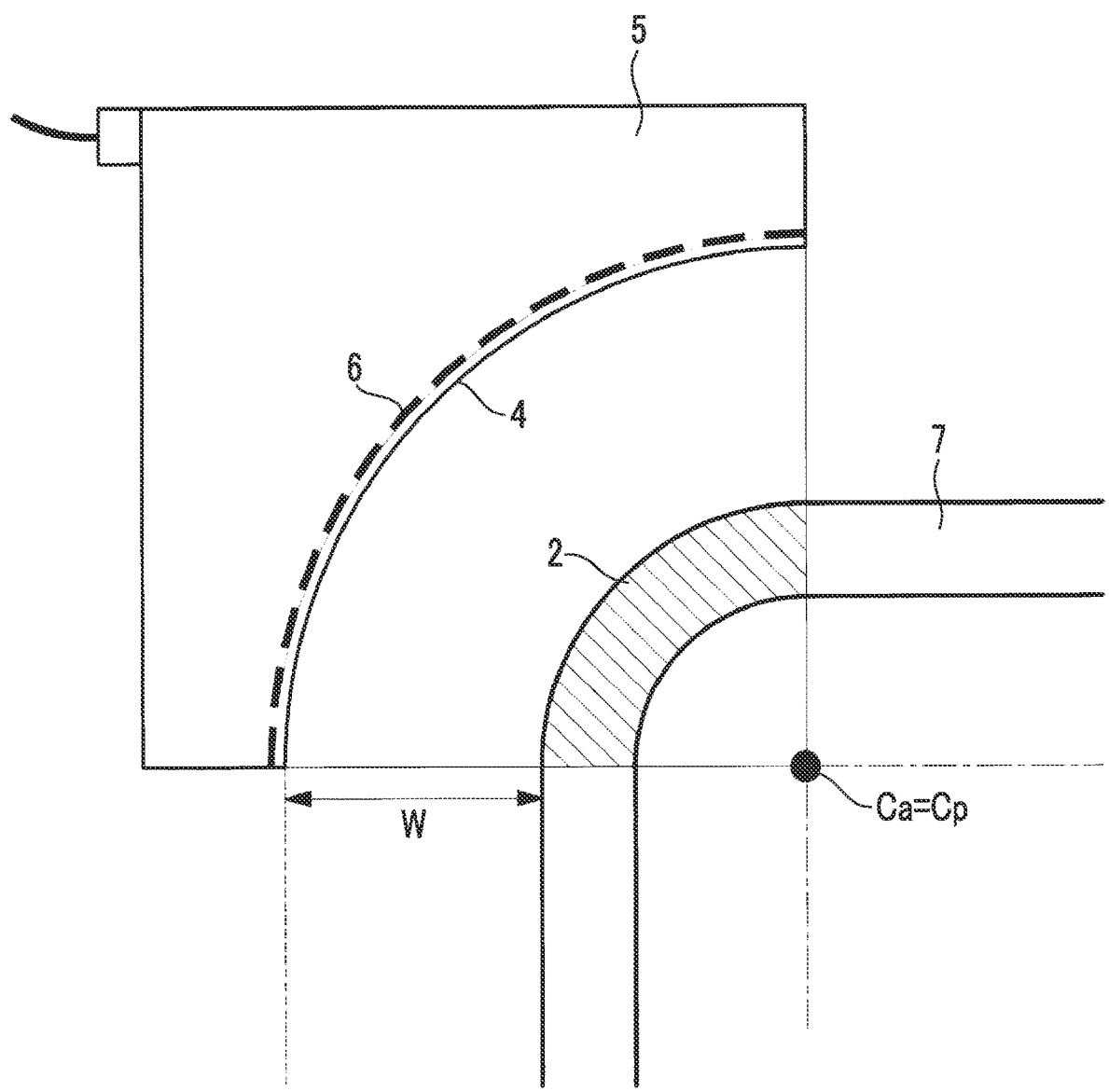
FIG. 5 is a view for explaining a positional relationship between a flaw detection probe and a subject at a reference scan position according to the embodiment of the present invention.

FIG. 4 is a diagram illustrating an example of the subject 7 on which a flaw detection inspection is performed by the ultrasonic flaw detection device 1 according to the present embodiment. The subject 7 has a corner portion 2 as illustrated in FIGS. 4 and 5. The corner portion 2 has a shape in which the curvature changes together with the scanning of the flaw detection probe 5. More specifically, the subject 7 has a shape in which the curvature of an outer curve in a cross section cut along a plane orthogonal to the scan direction differs depending on the scan position.

The ultrasonic flaw detection device 1 according to the present embodiment includes a function of detecting a flaw generated in the circumferential direction inside the corner portion 2 and estimating the length of the flaw in the circumferential direction.

In a case where a flaw detection is performed on the corner portion 2 of the subject 7, first, the flaw detection probe 5 is installed at a certain reference scan position (hereinafter referred to as "reference scan position"). In this case, as illustrated in FIG. 5, the inclination and water distance (a direct distance between the flaw detection probe 5 and the external surface of the corner portion 2) W of the flaw detection probe 5 are adjusted, and the flaw detection probe 5 is installed such that a curvature center Ca of the external curve of the cross section of the subject 7 at the reference scan position coincides with a curvature center Cp of the arc in which the oscillators 6 are lined up in the flaw detection probe 5. Details of the installation step of the flaw detection probe 5 will be described below.

Meanwhile, in a case where the flaw detection probe 5 is translated in the scan direction of the subject 7 (in FIG. 5, a depth direction of a paper surface) with the posture of the flaw detection probe 5 installed so as to match the external shape of the subject 7 at this reference scan position maintained, the curvature of the outer curve of the subject 7 differs depending on the scan position. Therefore, inspection conditions (for example, the distance between each oscillator 6 and the outer surface of the subject 7, the incidence angle of ultrasonic waves emitted from each oscillator 6 to the subject, and the like) will change. Then, due to changes in the inspection conditions, a range that can be inspected by the flaw detection probe 5 may be narrowed, or an error may occur in the length of the flaw estimated by the flaw estimation unit 32. Thus, the evaluation unit 30 according to the present embodiment includes a non-inspection range evaluation unit 31 that evaluates the range that cannot be inspected by the flaw detection probe 5, a correction unit 33 that compensates for the error in the flaw length, and the like.

Hereinafter, the non-inspection range evaluation unit 31 and the correction unit 33 according to the present embodiment will be sequentially described in detail with reference to the drawings.

Figure 6:
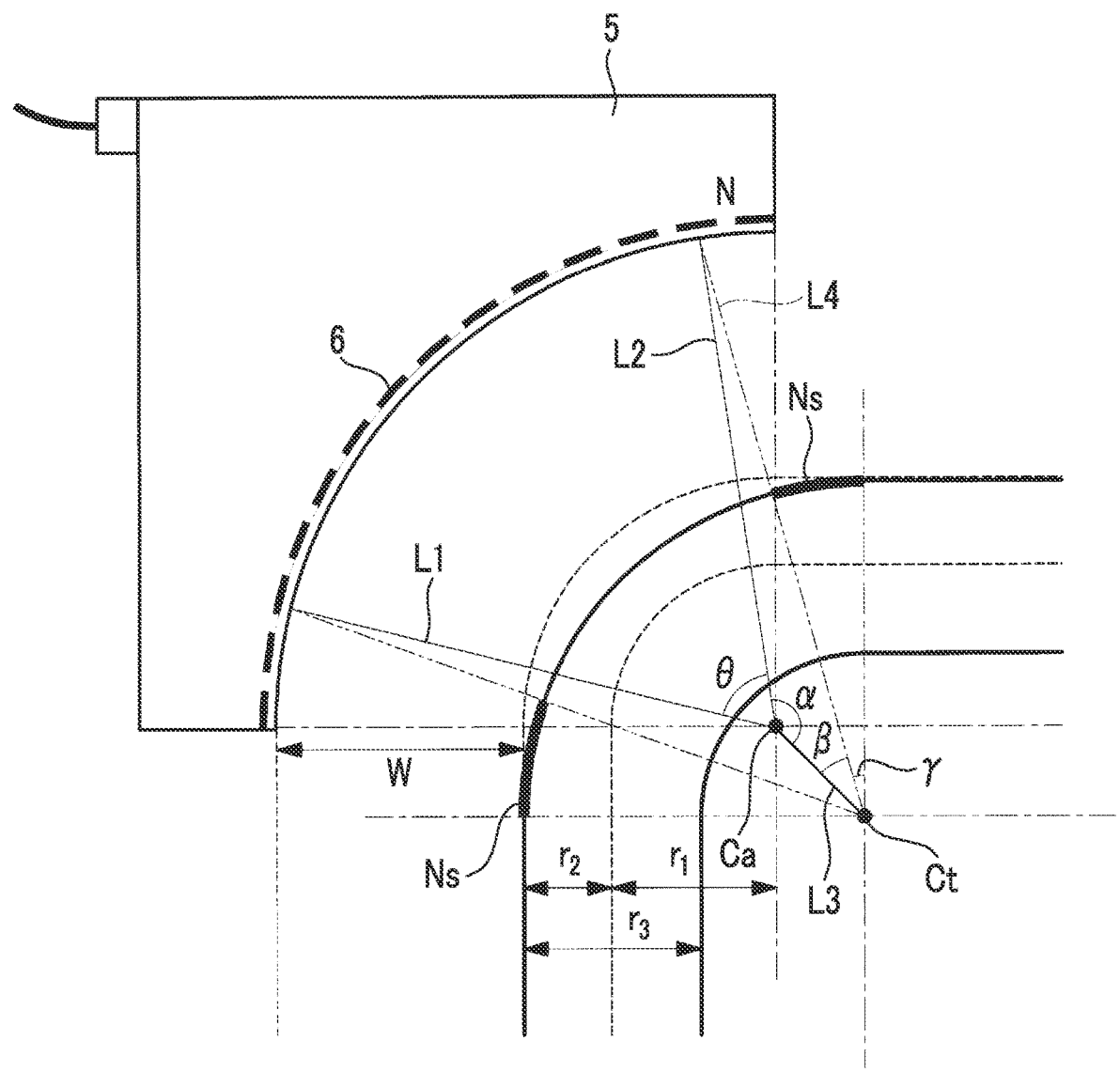
FIG. 6 is a view for explaining a calculation technique of a non-inspection range according to the embodiment of the present invention.

FIG. 6 is a diagram illustrated by projecting the cross sections of the subject 7 at the reference scan position and the scan position different from the reference scan position onto one cross section in order to compare both with each other. In the figure, a dotted line indicates the external curve of the subject 7 at the reference scan position, and a solid line indicates the external curve of the subject 7 at a given scan position (hereinafter referred to as "inspection scan position") different from the reference scan position.

As illustrated in FIG. 6, since the curvature of the outer curve changes when the scan position differs, the curvature center Ct of the external curve at the inspection scan position is a position deviating from the curvature center Ca (the curvature center Cp of the flaw detection probe 5) of the external curve at the reference scan position.

Then, in a case where an ultrasonic beam of which the converging position coincides with the curvature center Ct is emitted from the flaw detection probe 5 and the reflected beam is received, a non-inspection range Ns where the reflected beam cannot be received will occur. When this non-inspection range Ns is too large, the flaw detection performance will deteriorate, which is not preferable. Therefore, the non-inspection range evaluation unit 31 calculates the non-inspection range Ns and determines whether or not the calculated non-inspection range Ns is within a preset allowable value.

In a case where the non-inspection range evaluation unit 31 determines that the non-inspection range Ns is not within the allowable value, for example, the flaw estimation or the like at the scan position is postponed, the probe is switched to another flaw detection probe having a different curvature, and measures such as performing a flaw detection again is taken.

Hereinafter, a calculation technique of the non-inspection range Ns will be described with reference to a drawing.

First, when the angle between a straight line L1 connecting an opening at one end and the curvature center Ca of the outer curve at the reference scan position and a straight line L2 connecting an opening at the other end and the curvature center Ca is θ, θ is expressed by the following Expression (1).

[Expression 1]

$$\theta(deg) = 90 \times \frac{N - Qty + 1}{N} \qquad (1)$$

In Expression (1), N is the number of oscillators 6 and Qty is the number of openings.

Figure 7:
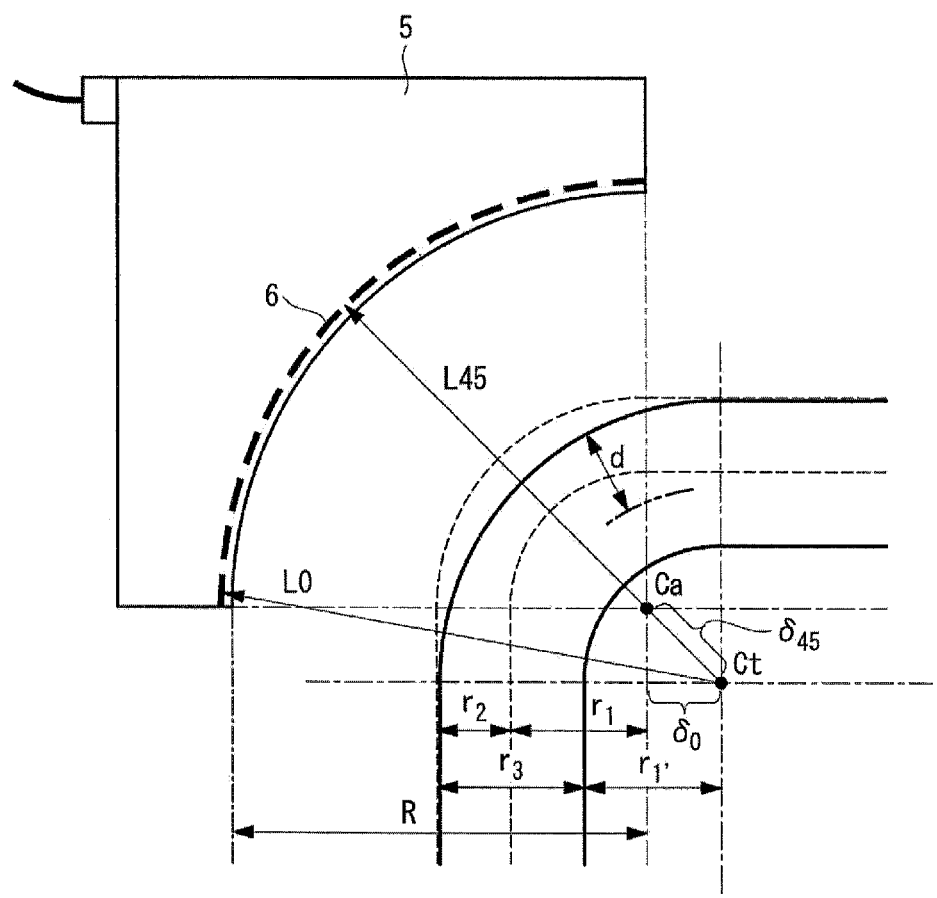
FIG. 7 is a view for explaining a correction coefficient according to the embodiment of the present invention.

In FIGS. 6 and 7, a distance δ45 of a straight line L3 connecting the curvature center Ca at the reference scan position and the curvature center Ct at the inspection scan position is expressed by the following Expression (2).

[Expression 2]

$$\delta_{45} = \sqrt{2} \times (r_3 - r_2) \qquad (2)$$

In Expression (2), r3 is the thickness of the corner portion 2 at the inspection scan position, and r2 is the thickness of the corner portion 2 at the reference scan position.

An angle α formed by the straight line L2 and the straight line L3 is expressed by the following Expression (3).

[Expression 3]

$$\alpha(deg) = 90 + 45 + \frac{90 - \theta}{2} \qquad (3)$$

Then, using the cosine theorem, a distance r4 of a straight line L4 connecting an opening of an end portion and the curvature center Ct at the inspection scan position is given by the following Expression (4).

[Expression 4]

$$r_4 = \sqrt{\delta_{45}^2 + (W + r_1 + r_2)^2 - 2\delta_{45}(W + r_1 + r_2)\cos\alpha} \qquad (4)$$

An angle β formed by the straight line L4 and the straight line L3 is given by the following Expression (5) using the above distance r4.

[Expression 5]

$$\beta = \cos^{-1}\left(\frac{\delta_{45}^2 + r_4^2 - (W + r_1 + r_2)^2}{2\delta_{45}r_4}\right) \qquad (5)$$

In Expressions (4) and (5), W is the water distance, in other words, the length of a line segment drawn perpendicularly to the external curve of the subject 7 at the reference scan position from the end portion of the flaw detection probe 5, and r1 is the distance from an internal curve of the cross section at the reference scan position to the curvature center Ca.

An angle γ of the straight line L4 with respect to the vertical direction of the cross section is expressed by the following Expression (6) using the angle β.

[Expression 6]

$$\gamma(deg) = 45 - \beta \qquad (6)$$

Finally, from the above Expressions (1) to (6), the non-inspection range Ns is expressed by the following Expression (7).

[Expression 7]

$$Ns = 2\pi(r_1 + r_3) \times \frac{\gamma}{360} \tag{7}$$

The non-inspection range evaluation unit 31 stores various Calculation Expressions (1) to (7) for calculating the above-described non-inspection range Ns, various data used for calculating the non-inspection range, and the allowable value of the non-inspection range Ns in advance, and calculates and evaluates the non-inspection range Ns using this information.

The calculation and evaluation timing of the non-inspection range Ns by the non-inspection range evaluation unit 31 may be performed each time the flaw detection probe 5 is moved to each scan position, or if the external shape of the subject 7 is known, the calculation and evaluation may be performed at a given timing after the installation of the flaw detection probe 5. In a case where the shape of the subject 7 is known, it is also possible to collectively calculate the non-inspection range Ns throughout the scan position.

Next, the correction process by the correction unit 33 according to the present embodiment will be described with reference to the drawings.

First, a calculation expression of a correction coefficient used by the correction unit 33 will be described with reference to FIG. 7. Similar to FIG. 6, FIG. 7 is a diagram illustrated by projecting the cross sections of the subject 7 at the reference scan position and the inspection scan position onto one cross section in order to compare both with each other. In the figure, a dotted line indicates an external curve at the reference scan position, and a solid line indicates an external curve at the inspection scan position.

Now, in a case where the length of the flaw in the circumferential direction at the position of thickness d from the outer surface is corrected, a correction coefficient at the reference scan position (hereinafter, referred to as "reference correction coefficient CfREF") is given by the following Expression (8).

[Expression 8]

$$Cf_{REF} = (r_1 + d)/R \tag{8}$$

In Expression (8), r1 is the distance from the internal curve of the cross section at the reference scan position to the curvature center Ca, and R is the curvature radius of the flaw detection probe 5.

In a case where the length of the flaw at the reference scan position is estimated by the flaw estimation unit 32, the correction unit 33 corrects the length of the flaw by multiplying the estimated the flaw length by the reference correction coefficient CfREF obtained by using the calculation expression expressed by the above Expression (8).

In contrast, for the inspection scan position, the reference correction coefficient cannot be used because the inspection conditions are different from those at the reference scan position. Specifically, since the curvature center Ct deviates from the curvature center Ca at the inspection scan position, the ultrasonic waves emitted from each oscillator 6 cannot be made incident perpendicularly to the outer surface of the subject 7, and the distance of a line segment connecting each oscillator 6 and the curvature center Ct, in other words, the propagation distance of the ultrasonic waves emitted from each oscillator 6 also differs depending on the location of the oscillator 6 and is not uniform. Therefore, it is necessary to further adjust the correction coefficient in consideration of these differences.

Hereinafter, the correction coefficient at the inspection scan position will be described.

For example, a length r45 of a line segment L45 connecting the oscillator 6 at a central portion of the flaw detection probe 5 and the curvature center Ct at the inspection scan position is expressed by r45=R+δ45. Here, R is the curvature radius of the flaw detection probe 5. In a case where this r45 is reflected in the calculation expression of the correction coefficient CfREF at the reference scan position expressed by the above Expression (8), the following Expression (9) is obtained.

[Expression 9]

$$Cf_{L45} = \frac{r_1 + (r_3 - d)}{R + \sqrt{2}(r_3 - r_2)} \tag{9}$$

Meanwhile, a length r0 of a line segment L0 connecting the oscillator 6 at the end portion of the flaw detection probe 5 and the curvature center Ct at the inspection scan position is expressed by r0≈R+δ0 from FIG. 7. Here, δ0=δ45/√2. When this r0 is reflected in the calculation expression of the correction coefficient CfREF at the reference scan position expressed by the above Expression (8), the following Expression (10) is obtained.

[Expression 10]

$$Cf_{L0} = \frac{r_1 + (r_3 - d)}{R + (r_3 - r_2)} \tag{10}$$

Then, an equation that always takes a larger correction coefficient among the correction coefficient obtained by the above Expression (9) and the correction coefficient obtained from Expression (10) is expressed by the following Expression (11). Here, g=r3−r2.

[Expression 11]

$$Cf_{MAX} = \frac{r_1 + r_3 - d}{R + g + \{(\sqrt{2} \cdot g - g) - |\sqrt{2} \cdot g - g|\}/2} \tag{11}$$

Meanwhile, an equation that always takes a smaller correction coefficient among the correction coefficient obtained by the above Expression (9) and the correction coefficient obtained from Expression (10) is expressed by the following Expression (12). Here, g=r3−r2.

[Expression 12]

$$Cf_{MIN} = \frac{r_1 + r_3 - d}{R + g + \{(\sqrt{2} \cdot g - g) + |\sqrt{2} \cdot g - g|\}/2} \tag{12}$$

The correction unit 33 stores various calculation expressions, specifically, Expressions (8), (11), and (12), for calculating the correction coefficients at the above-described respective scan positions, various data used for calculating the correction coefficients, and the like in advance, calculating appropriate correction coefficients by appropriately switching and using these calculation expressions, and corrects the length, in the circumferential direction, of the flaw estimated by the flaw estimation unit 32 using the calculated correction coefficients.

For example, in a case where the detection performance of the flaw by the flaw detection probe 5 is confirmed, it is preferable to correct the length of the flaw in a direction in which the length of the flaw is detected to be small. Therefore, the flaw is corrected by using a correction coefficient CfMIN. Meanwhile, in an actual flaw detection inspection, for example, it is preferable that the criteria are strict from the viewpoint of safety. Therefore, it is preferable to correct the flaw by using a correction coefficient CfMAX in which the flaw is detected to be large.

Next, an ultrasonic flaw detection method performed by the ultrasonic flaw detection device 1 according to the present embodiment including the above-described configuration and functions will be described with reference to FIG. 8. FIG. 8 is a flowchart illustrating an example of a procedure of the ultrasonic flaw detection method according to the present embodiment.

First, an installation step of installing the flaw detection probe 5 at the reference scan position of the subject 7 is performed (SA1). In the installation step, as illustrated in FIG. 5, the flaw detection probe 5 is installed such that the curvature center Ca of the external curve of the cross section at the reference scan position and the curvature center Cp of the flaw detection probe 5 coincide with each other. In other words, in the installation step, the flaw detection probe 5 is installed such that line segments drawn perpendicularly from the respective oscillators 6 to the external surface of the subject 7 are all within the same distance or an error therebetween is within a predetermined allowable range. By installing the flaw detection probe 5 at such a position, it is possible to make each ultrasonic wave emitted from each oscillator 6 of the flaw detection probe 5 incident perpendicularly to the external surface of the subject 7.

Here, in a case where the curvature of the curved surface 4 of the flaw detection probe 5 is fixed, a scan position where the curvature coincides with the curvature of the flaw detection probe 5 or the curvature error is within a preset allowable range is specified from the entire scan range of the subject 7, and the specified scan position is defined as the reference scan position.

In the case of a flexible flaw detection probe capable of changing the curvature of the curved surface 4 of the flaw detection probe 5, a given scan position of the subject 7 may be specified as the reference scan position, and the shape of the curved surface 4 of the flaw detection probe may be adjusted so as to have the same curvature as the curvature of the external curve of the subject 7 at the reference scan position.

When the flaw detection probe 5 is installed in an appropriate posture with respect to the reference scan position in this way, the beam control unit 22 subsequently acquires the delay distribution of an ultrasonic beam such that the ultrasonic beam is converged on the curvature center Ca of the outer curve of the subject 7 at the reference scan position, and controls each oscillator 6 on the basis of this delay distribution, thereby causing the ultrasonic beam emitted toward the subject 7 (SA2: beam control step).

Subsequently, the reflected beam reflected from the subject 7 is received by the receiving unit 23 (SA3: receiving step). The received reflected beam is output to the evaluation unit 30.

Subsequently, the flaw estimation unit 32 of the evaluation unit 30 estimates the length of the flaw in the circumferential direction on the basis of the received reflected beam (SA4: flaw estimation step). Since a technique of calculating the length of the flaw on the basis of the reflected beam is known, detailed description thereof is omitted here. That is, a technique of estimating the length of the flaw from the reflected beam may be appropriately selected from various known techniques and adopted.

Subsequently, the estimated length of the flaw is corrected by the correction unit 33 (SA5: correction step). Specifically, the correction unit 33 calculates the reference correction coefficient CfREF using Calculation Expression (8) of the reference correction coefficient stored in advance and corrects the length of the flaw by multiplying the length of the flaw estimated by the flaw estimation unit 32 by the calculated reference correction coefficient CfREF. The length of the flaw after the correction is associated with the scan position and stored in a given storage unit (not illustrated) or is displayed in real time on the display unit 34.

Subsequently, the scanning unit 21 moves the flaw detection probe 5 to the next scan position by moving the flaw detection probe 5 in the scan direction by a predetermined distance (SA6: scanning step). In this case, since the positions of the flaw detection probe 5 and the subject 7 may be moved relative to each other, the subject may be moved by a predetermined distance instead of the flaw detection probe 5.

When the flaw detection probe 5 is moved to the next scan position in this way, the non-inspection range evaluation unit 31 calculates the non-inspection range Ns at the scan position using the above-described calculation expression (SA7: non-inspection range evaluation step). In this flow, a case where the non-inspection range evaluation unit 31 calculates the non-inspection range Ns each time the flaw detection probe 5 is moved is exemplified and described. However, instead of this, as described above, the calculation and evaluation of the non-inspection range Ns are not limited to this timing.

Subsequently, it is determined whether or not the non-inspection range Ns is equal to or less than the allowable value (SA8). As a result, in a case where the non-inspection range Ns exceeds the allowable value (SA8: NO), the process returns to Step SA6 without performing the flaw detection inspection at the scan position, and the flaw detection probe 5 is moved to the next scan position.

On the other hand, when the non-inspection range Ns is equal to or less than the allowable value (SA8: YES), an ultrasonic beam is emitted to the subject 7 at the scan position. In this case, the beam control unit 22 causes the ultrasonic beam to be emitted from the flaw detection probe 5 such that the ultrasonic beam is converged on the curvature center Ct of the external curve at the scan position (SA9: beam control step). Since such an ultrasonic beam control technique is a known technique, detailed description thereof will be omitted here. As an example, in a case where the external shape of the subject 7 is known, the delay distribution at each scan position is stored in advance in the storage unit (not illustrated), and such an ultrasonic beam that the ultrasonic beam is converged on the curvature center Ct at each scan position can be emitted from the flaw detection probe 5 by reading out and utilizing the delay distribution stored in the storage unit at each scan position. In a case where the shape of the subject 7 is not known, for example, the shape of the subject can be grasped by radiating an ultrasonic beam for grasping the shape, and then the delay time may be adjusted so that an appropriate ultrasonic beam can be emitted.

Subsequently, the reflected beam of the ultrasonic beam is received by the receiving unit 23 (SA10: receiving step), and the length of the flaw in the circumferential direction on the basis of the received reflected beam is estimated by the flaw estimation unit 32 (SA11: flaw estimation step). Subsequently, the estimated length of the flaw is corrected by the correction unit 33 (SA12: correction step). For example, the correction unit 33 calculates the correction coefficient CfMAX using Calculation Expression (11) of the correction coefficient stored in advance and corrects the length of the flaw by multiplying the calculated correction coefficient CfMAX by the length of the flaw estimated by the flaw estimation unit 32. The length of the flaw after the correction is stored in the given storage unit in association with the scan position or is displayed in real time on the display unit 34.

Subsequently, it is determined whether or not the flaw detection inspection in all the inspection regions preset in the subject 7 is completed (SA13), and in a case where the flaw detection inspection is not completed (SA13: NO), the process returns to Step SA6, and the processing after Step SA6 is repeatedly performed. On the other hand, in a case where the flaw detection inspection in the entire inspection region is determined to be completed (SA13: YES), the process is ended.

As described above, according to the ultrasonic flaw detection device 1, the ultrasonic flaw detection method, and the ultrasonic flaw detection program according to the present embodiment, for example, in a case where a flaw detection inspection of the subject 7 is performed at an inspection scan position that is a scan position different from the reference scan position, an ultrasonic beam is emitted from the flaw detection probe 5 such that the inspection curvature center Ct, which is the curvature center of the external curve of the cross section of the subject 7, coincides with and the converging position of the ultrasonic beam, and the length of the flaw in the circumferential direction of the subject 7 is estimated using the reflected beam. In this case, at the inspection scan position, unlike the reference scan position, there is a case where ultrasonic waves cannot be made to be perpendicularly incident from each oscillator 6 toward the external surface of the subject 7 (for example, FIGS. 6 and 7). In such a case, since the propagation distance or the like of the ultrasonic waves emitted from each oscillator 6 is different, an error occurs in the length of the flaw estimated by the flaw estimation unit 32. Even in such a case, according to the present embodiment, a correction coefficient corresponding to the distance δ45 between the reference curvature center Ca at the reference scan position and the inspection curvature center Ct in the thickness direction of the subject 7 are used to correct the length of the flaw estimated by the flaw estimation unit 32. Thus, the inspection accuracy can be improved, and the reliability of the inspection can be improved.

As described above, at the inspection scan position, there is a case where it is not possible to make ultrasonic waves incident perpendicularly from each oscillator 6 toward the external surface of the subject 7. Therefore, a non-inspection range where the reflected beam from the subject 7 cannot be received may occur. In such a case, since the non-inspection range evaluation unit 31 that evaluates the non-inspection range where the reflected beam cannot be received is provided. Thus, for example, in a case where the non-inspection range exceeds the allowable value, it is possible to take measures such as re-inspection using a flaw detection probe that is more suitable for the external shape of the subject at the inspection scan position without performing the flaw detection inspection at the inspection scan position. Accordingly, it is possible to suppress a decrease in inspection accuracy due to the non-inspection range being larger than the allowable value.

Figure 9A:
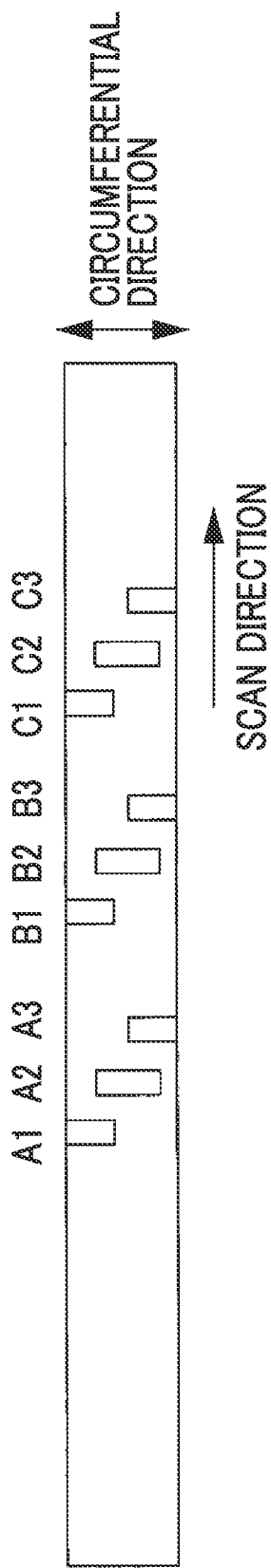
FIGS. 9A and 9B are views illustrating an example of inspection results in a case where a flaw detection inspection is performed using the ultrasonic flaw detection device according to the embodiment of the present invention.
Figure 9B:
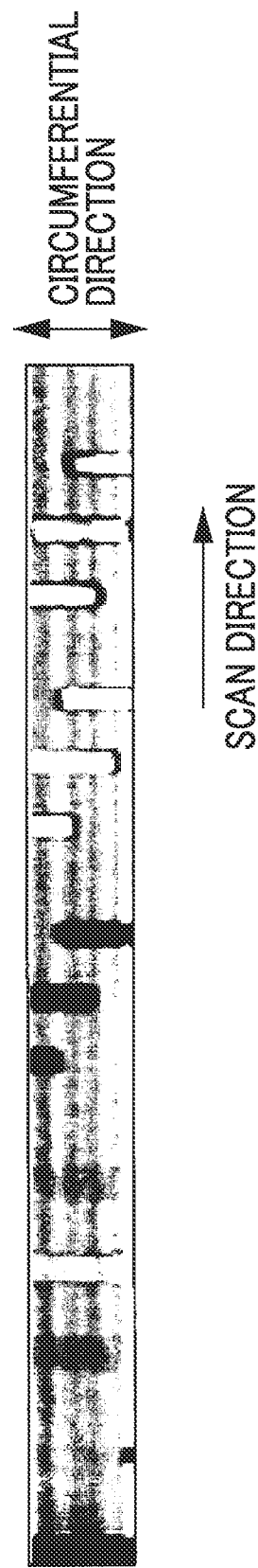

Next, FIGS. 9 and 10 show examples of inspection results in a case where a flaw detection inspection is performed using the ultrasonic flaw detection device 1 according to the present embodiment. As illustrated in FIG. 9A, in this inspection, a total of nine flaws A1 to A3, B1 to B3, and C1 to C3 having different lengths were artificially formed at intervals in the scan direction of the subject 7 and ultrasonic flaw detection was performed on such a subject 7. FIG. 9B is a diagram illustrating an example of a C-scan image in a case where the subject on which the artificial flaws illustrated in FIG. 9A are formed is subjected to a flaw detection inspection by the ultrasonic flaw detection device 1. As illustrated in FIG. 9B, it can be seen that all the artificial flaws have been detected.

FIG. 10 is a table illustrating the sizes of the flaws obtained in the above inspection. In FIG. 10, the flaw detection results of flaws A2, B2, and C2 are exemplified as typical examples. As illustrated in FIG. 10, the flaw sizes calculated by the flaw estimation unit 32 are 508.3 mm2 for A2, 496.6 mm2 for B2, and 426.8 mm2 for C2, all of which are calculated as values larger than actual flaw sizes. In contrast, the flaw sizes after being corrected using the correction coefficients CfMIN and CfMAX all showed values close to the actual flaw sizes, and improved accuracy in flaw detection was verified.

In the above embodiment, a case where ultrasonic waves are made incident from a convex side of the corner portion 2 of the subject 7 to perform a flaw detection is shown. However, the flaw detection may be performed by making ultrasonic waves incident from a recessed portion side of the corner portion 2 of the subject 7.

Hereinafter, a calculation technique of the non-inspection range by the non-inspection range evaluation unit 31 and the correction coefficient used by the correction unit 33 in a case where ultrasonic waves are made to be incident from the recessed portion side of the corner portion 2 of the subject 7 will be described in detail.

Figure 11:
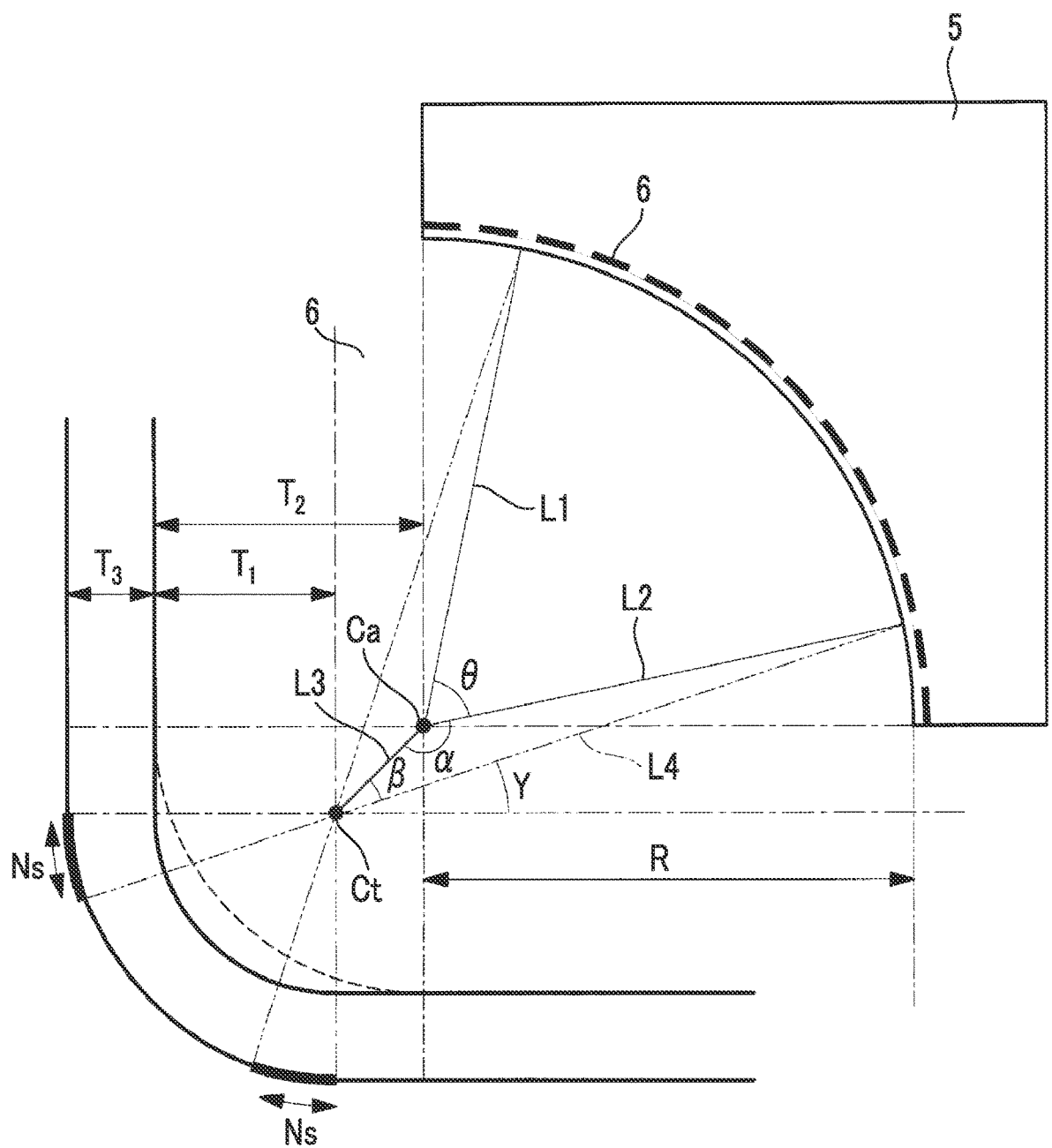
FIG. 11 is a view for explaining a calculation technique of an inspected range in a case where a flaw detection inspection is performed from a recessed portion side of a corner portion in the ultrasonic flaw detection device according to the embodiment of the present invention.

First, the calculation technique of the non-inspection range Ns will be described with reference to FIG. 11. FIG. 11 is a diagram illustrated by projecting the cross sections of the subject 7 at the reference scan position and the inspection scan position onto one cross section in order to compare both with each other. In the figure, a dotted line indicates an external curve at the reference scan position, and a solid line indicates an external curve at the inspection scan position.

First, when the angle between a straight line L1 connecting an opening at one end and the curvature center Ca of the outer curve at the reference scan position and a straight line L2 connecting an opening at the other end and the curvature center Ca is θ, θ is expressed by the following Expression (13).

[Expression 13]

$$\theta(\deg) = 90 \times \frac{N - Qty + 1}{N} \quad (13)$$

In Expression (13), N is the number of oscillators 6 and Qty is the number of openings.

In FIG. 11, a distance δ45 of a straight line L3 connecting the curvature center Ca at the reference scan position and the curvature center Ct at the inspection scan position is expressed by the following Expression (14).

[Expression 14]

$$\delta_{45} = \sqrt{2} \times (T_2 - T_1) \quad (14)$$

In Expression (14), T2 is a curvature radius at the reference scan position, and T1 is a curvature radius at the inspection scan position.

An angle α formed by the straight line L2 and the straight line L3 is expressed by the following Expression (15).

[Expression 15]

$$\alpha(\deg) = 90 + 45 + \frac{90-\theta}{2} \quad (15)$$

Then, using the cosine theorem, a distance r4 of a straight line L4 connecting an opening of an end portion and the curvature center Ct at the inspection scan position is given by the following Expression (16).

[Expression 16]

$$r_4 = \sqrt{\delta_{45}^2 + R^2 - 2\delta_{45} \cdot R \cdot \cos\alpha} \quad (16)$$

In the above Expression (16), R is the curvature radius of the flaw detection probe.

The angle β formed by the straight line L4 and the straight line L3 is given by the following Expression (17) using the above distance r4.

[Expression 17]

$$\beta = \cos^{-1}\left(\frac{\delta_{45}^2 + r_4^2 - R^2}{2\delta_{45}r_4}\right) \quad (17)$$

The angle γ of the straight line L4 with respect to the vertical direction of the cross section is expressed by the following Expression (18) using the angle β.

[Expression 18]

$$\gamma(\deg) = 45 - \beta \quad (18)$$

Finally, from the above Expressions (13) to (18), the non-inspection range Ns is expressed by the following Expression (19).

[Expression 19]

$$Ns = 2\pi(T_1 + T_3) \times \frac{\gamma}{360} \quad (19)$$

In Expression (19), T3 is the thickness of the subject 7 at the inspection scan position.

The non-inspection range evaluation unit 31 stores various Calculation Expressions (13) to (19) for calculating the non-inspection range Ns in a case where an inspection is performed from the recessed portion side, various data for calculating the non-inspection range, and the allowable value of the non-inspection range Ns in advance, and calculates and evaluates the non-inspection range Ns using this information. In this way, by storing the calculation expressions and the like in a case where the flaw detection inspection is performed from the recessed portion side of the corner portion 2, it is possible to handle both a case where the flaw detection inspection is performed from the convex side and a case where the flaw detection inspection is performed from the recessed portion side.

Figure 12:
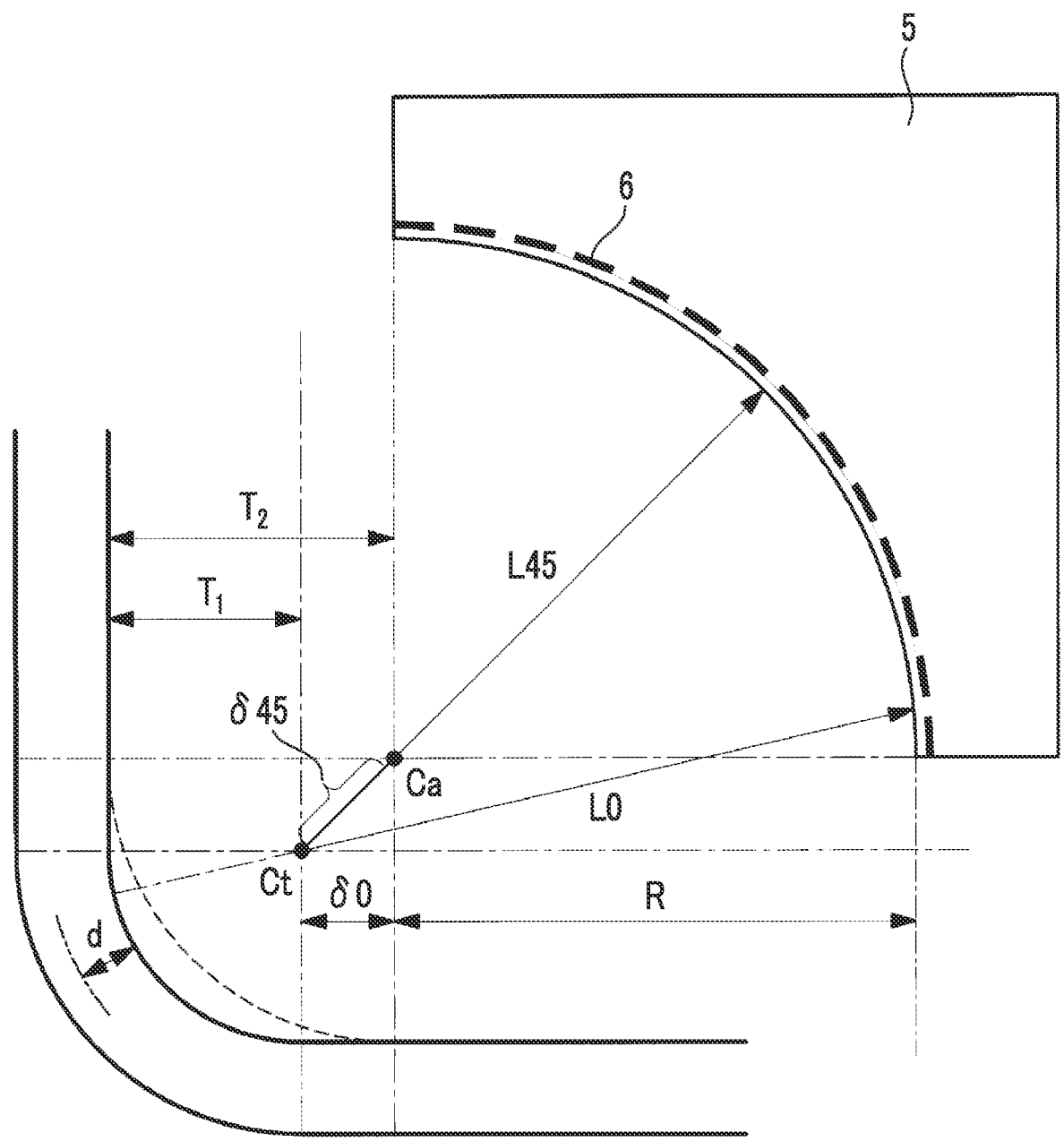
FIG. 12 is a view for explaining a correction coefficient in a case where a flaw detection inspection is performed from the recessed portion side of the corner portion in the ultrasonic flaw detection device according to the embodiment of the present invention.

Subsequently, the correction coefficient used by the correction unit 33 will be described with reference to FIG. 12. FIG. 12 is a diagram illustrated by projecting the cross sections of the subject 7 at the reference scan position and the inspection scan position onto one cross section in order to compare both with each other. In the figure, a dotted line indicates an external curve at the reference scan position, and a solid line indicates an external curve at the inspection scan position.

The length r45 of a line segment L45 connecting the oscillator 6 at a central portion of the flaw detection probe 5 and the curvature center Ct at the inspection scan position is expressed by r45=R+δ45. Here, R is the curvature radius of the flaw detection probe 5. When this r45 is reflected in the calculation expression of the correction coefficient CfREF at the reference scan position expressed by the above Expression (8), the following Expression (20) is obtained.

[Expression 20]

$$Cf_{L45} = \frac{T_1 + d}{R + \sqrt{2}(T_2 - T_1)} \quad (20)$$

In Expression (20), T1 is the curvature radius at the inspection scan position, and T2 is the curvature radius at the reference scan position.

Meanwhile, a length r0 of a line segment L0 connecting the oscillator 6 at the end portion of the flaw detection probe 5 and the curvature center Ct at the inspection scan position is expressed by r0≈R+δ0 from FIG. 12. Here, δ0=δ45/√2. When this r0 is reflected in the calculation expression of the correction coefficient CfREF at the reference scan position expressed by the above Expression (8), the following Expression (21) is obtained.

[Expression 21]

$$Cf_{L0} = \frac{T_1 + d}{R + (T_2 - T_1)} \quad (21)$$

Then, an equation that always takes a larger correction coefficient among the correction coefficient obtained by the above Expression (20) and the correction coefficient obtained from Expression (21) is expressed by the following Expression (22). Here, g=T2−T1.

[Expression 22]

$$Cf_{MAX} = \frac{T_1 + d}{R + g + \{(\sqrt{2} \cdot g - g) - |\sqrt{2} \cdot g - g|\}/2} \quad (22)$$

Meanwhile, an equation that always takes a smaller correction coefficient among the correction coefficient obtained by the above Expression (20) and the correction coefficient obtained from Expression (21) is expressed by the following Expression (23). Here, g=T2−T1.

[Expression 23]

$$Cf_{MIN} = \frac{T_1 + d}{R + g + \{(\sqrt{2} \cdot g - g) + |\sqrt{2} \cdot g - g|\}/2} \quad (23)$$

By storing in advance Expressions (22) and (23), which are the calculation expressions of the correction coefficient used in a case where the flaw detection inspection is performed from the above-described recessed portion side, the correction unit 33 can handle both a case where the flaw detection inspection is performed from the convex side and a case where the flaw detection inspection is performed from the recessed portion side.

Although the present invention has been described above using the embodiments, the technical scope of the present invention is not limited to the scope described in the above embodiments. Various modifications or improvements can be made to the above embodiments without departing from the spirit of the invention, and the modified or improved forms are also included in the technical scope of the present invention. The above embodiments may be appropriately combined.

The flow of the ultrasonic flaw detection method described in the above embodiment is also an example, and unnecessary steps may be deleted, new steps may be added, or the processing order may be replaced without departing from the spirit of the present invention.

REFERENCE SIGNS LIST

1: Ultrasonic flaw detection device
2: Corner portion
4: Curved surface
5: Flaw detection probe
6: Oscillator
7: Subject
10: Inspection device
11: CPU
12: Auxiliary storage device
13: Main storage device
14: Communication interface
15: Input unit
16: Display unit
18: Bus
20: Probe control unit
21: Scanning unit
22: Beam control unit
23: Receiving unit
30: Evaluation unit
31: Non-inspection range evaluation unit
32: Flaw estimation unit
33: Correction unit
34: Display unit

The invention claimed is:

1. An ultrasonic flaw detection device that performs an ultrasonic flaw detection on a subject of which an external shape changes in a scan direction, using a flaw detection probe that is a phased-array ultrasonic flaw detection probe in which a plurality of oscillators are disposed in an arc shape at intervals, the ultrasonic flaw detection device comprising:
a scanning unit that moves, in the scan direction of the subject, the flaw detection probe installed such that a reference curvature center, which is a curvature center of an external curve of a cross section of the subject at a reference scan position of the subject, coincides with a curvature center of the flaw detection probe;
a beam control unit that controls an ultrasonic beam emitted from the flaw detection probe such that a converging position of the ultrasonic beam coincides with an inspection curvature center that is a curvature center of an external curve of a cross section of the subject at each scan position;
a receiving unit that receives a reflected beam reflected from the subject; and
a flaw estimation unit that estimates a length of a flaw in a circumferential direction of the subject on the basis of the reflected beam; and
a correction unit that corrects an estimated length of the flaw by using a correction coefficient according to an amount of deviation between the reference curvature center and each inspection curvature center in a thickness direction of the subject.

2. The ultrasonic flaw detection device according to claim 1, further comprising:
a non-inspection range evaluation unit that evaluates a non-inspection range where the reflected beam from the subject cannot be received in accordance with the amount of deviation between the reference curvature center and each inspection curvature center in the thickness direction of the subject.

3. An ultrasonic flaw detection method of performing an ultrasonic flaw detection on a subject of which an external shape changes in a scan direction, using a flaw detection probe that is a phased-array ultrasonic flaw detection probe in which a plurality of oscillators are disposed in an arc shape at intervals, the ultrasonic flaw detection method comprising:
an installation step of installing a flaw detection probe such that a reference curvature center, which is a curvature center of an external curve of a cross section of the subject at a reference scan position of the subject coincides with a curvature center of the flaw detection probe;
a scanning step of moving the flaw detection probe in the scan direction of the subject;
a beam control step of controlling an ultrasonic beam emitted from the flaw detection probe such that a converging position of the ultrasonic beam coincides with an inspection curvature center that is a curvature center of an external curve of a cross section of the subject at each scan position;
a receiving step of receiving a reflected beam reflected from the subject; and
a flaw estimation step of estimating a length of a flaw in a circumferential direction of the subject on the basis of the reflected beam; and
a correction step of correcting an estimated length of the flaw by using a correction coefficient according to an amount of deviation between the reference curvature center and each inspection curvature center in a thickness direction of the subject.

4. The ultrasonic flaw detection method according to claim 3, further comprising:
a non-inspection range evaluation step of evaluating a non-inspection range where the reflected beam from the subject cannot be received in accordance with the amount of deviation between the reference curvature center and each inspection curvature center in the thickness direction of the subject.

5. A non-transitory computer-readable storage medium storing an ultrasonic flaw detection program for performing an ultrasonic flaw detection on a subject of which an external shape changes in a scan direction, using a flaw detection probe that is a phased-array ultrasonic flaw detection probe in which a plurality of oscillators are disposed in an arc shape at intervals, the non-transitory computer-readable storage medium storing the ultrasonic flaw detection program causing a computer to execute:
a scanning process of moving, in the scan direction of the subject, the flaw detection probe installed such that a reference curvature center, which is a curvature center of an external curve of a cross section of the subject at a reference scan position of the subject, coincides with a curvature center of the flaw detection probe;

a beam control process of controlling an ultrasonic beam emitted from the flaw detection probe such that a converging position of the ultrasonic beam coincides with an inspection curvature center that is a curvature center of an external curve of a cross section of the subject at each scan position;

a receiving process of receiving a reflected beam reflected from the subject;

a flaw estimation process of estimating a length of a flaw in a circumferential direction of the subject on the basis of the reflected beam; and a correction process of correcting an estimated length of the flaw by using a correction coefficient according to an amount of deviation between the reference curvature center and each inspection curvature center in a thickness direction of the subject.

6. The non-transitory computer-readable storage medium storing the ultrasonic flaw detection program according to claim 5, causing the computer to further execute:

a non-inspection range evaluation process of evaluating a non-inspection range where the reflected beam from the subject cannot be received in accordance with the amount of deviation between the reference curvature center and each inspection curvature center in the thickness direction of the subject.

* * * * *